United States Patent [19]
Hess et al.

[11] 3,880,585
[45] Apr. 29, 1975

[54] METHOD OF INHIBITING STRESS CRACKING

[76] Inventors: Daniel N. Hess, P.O. Box 413, Norris, Tenn. 37827; Ramon A. Bannister, 1710 Atlantic Ave., Sullivan Island, S.C. 29482

[22] Filed: May 18, 1972

[21] Appl. No.: 254,452

[52] U.S. Cl.............. 21/2.7 R; 176/38; 176/92 R; 252/387
[51] Int. Cl. ...... C23f 9/02; C23f 11/00; C23f 11/08
[58] Field of Search ......... 21/2.7 R; 176/38, 46, 54, 176/92 R

[56] References Cited
UNITED STATES PATENTS
2,837,474  6/1958  Cartledge............................. 176/38
2,945,794  7/1960  Winters et al. ...................... 176/46

OTHER PUBLICATIONS
Berry, Warren E., Corrosion in Nuclear Applications, John Wiley and Sons, Inc., New York, N.Y., pages 318–321, P.O.S.L. TK9350.B46, 1971.

Primary Examiner—Morris O. Wolk
Assistant Examiner—Dale Lovercheck

[57] ABSTRACT

A method of inhibiting stress cracking in stainless steel articles exposed to a chloride-ion containing fluid environment in which the surface of the stainless steel article is contacted with a trace amount of an inorganic metal salt or with the metal corresponding to the cation of the salt so as to enlarge the anodic areas on the surface and increase the uniformity of the electrical potential of the surface thereby eliminating concentrated non-uniform attack on the surface and attendant cracking.

5 Claims, No Drawings

METHOD OF INHIBITING STRESS CRACKING

The use of stainless steel in systems, particularly austenitic chromium-nickel stainless steels, starting with a modest use of a few decades ago, has proliferated into widespread use in many applications such as boilers, power plants and the like. For instance, stainless steel is widely used in such areas as the petrochemical field, desalinization installations, and electric utility plants. From its inception, the use of stainless steel has always presented some problems in its industrial applications but, in particular, there is the pesky unpredictable problem of what is referred to as "stress corrosion cracking," that is the occurrence of brittle fractures in steel.

While the term "stress corrosion cracking" is widely used to describe such stainless steel fractures, it is thought that the inclusion of the word "corrosion" in such a term is misleading. While undoubtedly cracking in stainless steel is a corroding process, corrosion of the type that causes cracking is focused on those specific areas of the stainless steel surface at which cracking occurs rather than throughout the stainless steel surface as the term "corrosion" implies. Therefore, it is thought that a more appropriate term for such cracking is " stress cracking" and this term is used hereinafter to describe the occurrence of such fractures in steel.

The widespread use of stainless steel has focused extensive research and development efforts onto the problem of eliminating or substantially reducing such cracking since not only is stainless steel expensive but the cost of plant operation is magnified considerably when such plant must be shut down for replacement and repair of cracked stainless steel components. Furthermore, the incidence of industrial failures of austenitic stainless steel by stress cracking in chloride-bearing electrolytes has now reached a high degree of concern further adding to the urgent need for a solution to the problem.

It is commonly recognized that stress cracking in stainless steel results from the simultaneous action of tensile stress and a chloride-oxygen containing enviroment. The chloride-bearing electrolytes are recognized as being a source of cracking of austenitic stainless steels and although there is not complete agreement on the mechanism by which the chloride-ion attacks the steel, it is recognized as being the culprit.

The potency of the chloride-ion in producing "stress corrosion cracking" has been well demonstrated by authorities working in the field. Such authorities are in general agreement that the cracking can occur readily in stainless steel specimens immersed in water containing only a few parts per milliom (ppm) of chloride-ions. The temperature of the chloride-ion containing water is not particularly significant in producing such cracking as, in addition to producing cracking at boiling temperatures and above, water temperatures as low as 75°C. even in such dilute solutions have been known to produce cracking in stainless steel. Furthermore, such cracking appears to occur in specimens both stressed and unstressed and there appears to be little difference between the resistance of stainless steel to cracking between the various types of stainless steel.

Therefore, efforts have been made to eliminate the chloride-ions from the water or other solutions with which the stainless steel is contacted to thereby reduce stress cracking. In the nuclear reactor field, particularly in the power generating nuclear reactor plant, conduits such as pipes, tubing, pipe fitting, etc. are generally formed from stainless steels and in such reactors, wherein both a primary and a secondary water system is utilized, it is extremely important to eliminate any cracking in the conduits of the secondary system since repair or replacement is difficult or at best extremely costly from the standpoint of down-time if stress cracking occurs. It is therefore the common practice to subject the water used in such secondary systems to extensive purification processes to eliminate all traces of the chloride-ion to avoid such cracking. It can be understood that due to the vast quantities of water used in such systems such as a nuclear reactor secondary system, such water purification processes are extremely expensive and utilize equipment of extremely high cost. Furthermore, even though the processed water is subjected to such purification processes, some traces of the chloride-ion generally remain so that stress cracking cannot be precluded under present day practices.

As has been referred to above, the mechanism of stress cracking is not completely understood but it is generally believed that it is electrochemical in nature. The surface of the stainless steel is considered to consist of large cathodic areas and other very miniscule anodic areas. Thus, in an environment such as water containing a quantity of chloride-ions, an electric current flows through the anodic areas to the surrounding cathodic areas with the circuit being completed through the metal itself. As a result of the extreme narrowness of the anodic areas at the grain boundaries, the current density is relatively high in these areas so that the metal goes into solution rapidly at the anodic areas producing a site of structural weakness with resultant cracking.

Accordingly, a primary object of this invention is to provide a new and novel method of inhibiting stress cracking in stainless steel.

Another object of this invention is to provide a new and novel method of reducing stress cracking of stainless steels in contact with any solution containing chloride-ions.

Still another object of this invention is to provide a new and novel method of inhibiting stress cracking of stainless steels which requires the use of only minute quantities of a relatively inexpensive compound.

A further object of this invention is to provide a new and novel process for eliminating stress cracking in stainless steel constructions exposed to water containing chloride-ions such as in the secondary system of a pressurized water nuclear reactor, or industries utilizing stainless steel or the like.

This invention further contemplates the provision of a new and novel method of eliminating stress cracking in stainless steels which may be carried out in a simple and easy manner, which is extremely inexpensive both in operation and materials used and which may be carried out effectively through a wide variety of chloride containing electrolytes to prevent cracking in stainless steel components so as to virtually eliminate any need for maintanence or replacement of such components over prolonged periods of time.

A still further object of this invention is to provide a new and novel method of eliminating stress cracking in stainless steel components in the secondary system of a pressurized water nuclear reactor which also may be used as an alarm system for signalling the presence of a leak between the primary and secondary systems of such a reactor.

Other objects and advantages of the invention will become apparent from the following description.

The objects stated above and other related objects of the invention are accomplished by the provision of a stainless steel article, the surface of which is exposed to a chloride-ion containing environment such as water containing chloride-ions. The surface of the stainless steel is contacted with a metal salt or the corresponding metal of the salt, the metal being selected from a group having a position in the electromotive force series such that the metal exerts an electrochemical potential on the exposed stainless steel surface so as to increase the uniformity of the electric potential of the stainless steel surface thereby eliminating concentrated non-uniform electrochemical attack on the isolated specific anodic areas of the surface and attendant cracking.

The novel features which are believed to be characteristic of the invention are set forth with particularity in the appended claims. The invention itself, however, both as to its organization and method of operation may be best understood by reference to the following description.

In the practice of the invention, it is within the scope of the invention to introduce a compound such as a metal salt, preferably a nitrate such as mercuric nitrate monohydrate [$Hg(NO_3)_2 \cdot H_2O$] into a chloride-containing electrolyte containing at least traces of the chloride-ion. The amount of mercuric nitrate added to the solution is preferably within the range of 2–1,000 parts per million (ppm) of fluid. The test results to follow indicate also that adjustment of the pH of the fluid environment by means of nitric acid ($HNO_3$) has a beneficial effect in that the amount of mercuric nitrate required can be substantially reduced.

With this selected quantity of mercuric nitrate added to the electrolyte solution, cracking of the stainless steel immersed in the solution was virtually eliminated. It will be noted that in the test results to follow it was found that the temperature of the solution is relatively inconsequential as to the beneficial results obtained by the method of the invention.

It is thought that the introduction of the compound mercuric nitrate into the solution brings about an electro-chemical effect on the surface of the stainless steel with which the electrolyte solution is in contact. This electrochemical effect manifests itself in the enlargement of the rather limited number of small, specific anodic areas on the stainless steel surface where cracking characteristically occurs due to the high current density at these anodic areas. The mercuric nitrate or "inhibitor" appears to enlarge these anodic areas throughout the surface area of the stainless steel consequently reducing the cathodic areas on the surface with the result that the potential of the stainless steel surface is more uniform. Thus, current density at the grain boundaries or anodic areas is reduced by changing the electrical characteristics of the steel surface from one which is primarily cathodic to one which is uniformly, slightly more anodic thereby eliminating any high density current attack on highly anodic areas and attendant cracking. As a result of this uniform surface potential, localized attack does not occur. In addition, the steel surface is so passivated that there is no detectable increase in the rate of corrosion of the surface. Instead, it appears that the corrosion rate is decreased.

While the electrochemical theory advanced above appears to be well substantiated in the test results, a concomitant or alternate phenomena may also result from the practice of the novel method of the invention. There is some evidence to indicate and this evidence appears in the test results of Table IV that a molecular coating of metal such as mercury, when mercuric nitrate is the additive, is formed on the stainless steel thereby serving to protect against attack by the chloride-ions in the fluid enviroment. It is thought that such a metal or mercury coating is only a few atoms in thickness, the metal being deposited out of the solution in minute quantitites on the stainless steel surface to produce the desired effect.

Various examples were conducted to show the beneficial results obtained with the method of the invention. In the examples set forth in Table I below, 2,000 milliliters of an aqueous solution containing 0.04 moles of $UO_2SO_4$, 0.02 moles of $H_2SO_4$ and 0.005 moles of $CuSC$ were provided at the temperature of approximately 100°C. Chloride-ions were introduced in the solution as KCl or NaCl to provide a concentration of approximately 50 ppm of such ions.

This uranyl sulfate test solution was selected as being a useful solution by experimenters in the past for accelerated evaluation of the cracking behavior of stainless steel in a chloride-ion fluid enviroment. As the uranyl sulfate solution containing 25 ppm or greater of chloride-ions is very aggressive, it produces stainless steel cracking in a reasonable period of time, i.e., in about 500 hours whereas water alone containing chloride-ions requires relatively longer periods of time to produce stainless steel cracking.

The solution was constantly stirred by a water-saturated air stream injected into the solution and a condenser was used to return steam as water back to the solution container. Make up water was added to maintain to original volume of the solution throughout the test.

The stainless steel specimens of Examples 1–10 were Type 347 stainless steel, hot-rolled, annealed and pickled with a 2B finish and with edges polished with 80-120 grit. The specimens were cut from a 1/16 inch sheet and were U-shaped in configuration, the free ends being connected by a bolt. The specimens of Examples 11, 12 were of a type stainless steel identified as PH 15-7Mo and were ⅛ inch thick with a 2D finish polished with 80–120 grit.

It will be noted in Example 11 of Table I that the test conducted on this specimen was in three parts, identified as 11(a) – (c). The specimen of Example 11 remained in the solution for the time periods shown, cracks developing after 332 hours in 11(a); additional cracks occurring after 500 hours 11(b); and finally in 11(c) following the introduction of the amount of additive shown into the solution no additional cracks on the specimen occurred after 1,000 hours. The specimens of Examples 13, 14 were of the same type of stainless steel as in Examples 11, 12 except that the specimens were polished after 1750°F. heat treatment, formed into a U-shaped configuration and pickled after 950°F. heat treatment. The specimens of Examples 15–17 were Type AM 350 stainless steel, 1/16 inch thick, heat treated for 2 hours at 1950°F., pickled and polished with 80–120 grit, the specimen of Example 17 being in the solution-cooled and tempered condition. In Example 12(a) no cracking occurred within 500 hours when the specimen was placed in the test solution containing the additive shown. However, when the same specimen was placed in the test solution containing no additive cracking occurred within the next 500 hours as shown in Example 12(b).

The results of these examples are set forth in Table I below:

TABLE I

| Experiment No. | Type of Stainless Steel | Additive (ppm) | Cracking | Time (hrs) | Corrosion Rate (mpy) |
|---|---|---|---|---|---|
| 1 | 347 | none | yes | 50 | |
| 2 | 347 | none | yes | 384 | 19 |
| 3 | 347 | 70 Hg(NO$_3$)$_2$ | yes | 193 | 18 |
| 4 | 347 | 150 HgCl$_2$ | yes | 247 | 13 |
| 5 | 347 | 500 HgSO$_4$ | no | 360 | 3 |
| 6 | 347 | 500 Hg(Cl)$_2$ | yes | 96 | 80 |
| 7 | 347 | 500 Hg(Cl)$_2$ | yes | 96 | 56 |
| 8 | 347 | 500 Hg(NO$_3$)$_2$ | no | 2000 | 0.02 |
| 9 | 347 | 500 Hg(NO$_3$)$_2$ | no | 2000 | 0.01 |
| 10 | 347 | 500 Hg(NO$_3$)$_2$ | no | 2000 | 0.02 |
| 11(a) | PH 15-7Mo | none | yes | 332 | |
| (b) | PH 15-7Mo | none | yes | 500 | |
| (c) | PH 15-7Mo | 500 Hg(NO$_3$)$_2$ | no | 1000 | |
| 12(a) | PH 15-7Mo | 500 Hg(NO$_3$)$_2$ | no | 500 | |
| 12(b) | PH 15-7Mo | none | yes | 500 | |
| 13 | PH 15-7Mo | none | yes | 69 | |
| 14 | PH 15-7Mo | 500 Hg(NO$_3$)$_2$ | no | 2000 | 0.29 |
| 15 | AM 350 | none | no | 1000 | 0.11 |
| 16 | AM 350 | 500 Hg(NO$_3$)$_2$ | no | 1000 | 0.03 |
| 17 | AM 350 | 500 Hg(NO$_3$)$_2$ | no | 1000 | 0.04 |

In another set of examples, the solution in which the stainless steel specimens were immersed was an aqueous solution of water into which chloride-ions as KCl or NaCl in the quantity of 50 ppm was introduced. The steel specimens used in the examples set forth in Table II were Type 347 stainless steel cut from 1/16 inch sheet hot-rolled, annealed and pickled with a 2B finish. The edges were polished with a 80–120 grit. Mercuric nitrate was added to the chloride-ion containing water solution at 300°C. and under 150 psi of oxygen pressure in the amounts shown to obtain the novel results of the invention. These examples are set forth as follows in Table II below:

TABLE II

| Experiment No. | Type of Stainless Steel | Additive (ppm) | Cracking | Time (hrs) | Corrosion Rate |
|---|---|---|---|---|---|
| 1 | 347 | 300 Hg(NO$_3$)$_2$ | no | 2376 | 0 |
| 2 | 347 | 150 Hg(NO$_3$)$_2$ | no | 1000 | 0 |

It will be noted from the examples of Table II that the addition of mercuric nitrate to the solution completely eliminated cracking of the stainless steel specimens although the test was conducted for extremely long periods of time. Also, the specimens showed no measurable corrosion further exhibiting the corrosion preventing results of the novel method of the invention.

One of the classic tests used to evaluate the cracking susceptibility of stainless steel is the immersion of a steel sample in boiling 42 percent MgCl$_2$ solution which is a very aggressive solution. Consequently, in order to show the efficacy of the method of the invention, a series of examples were conducted on stainless steel specimens immersed in such boiling magnesium chloride solution both with and without the addition of mercuric nitrate, one novel compound used in the method of the invention. The solution used was 92 milliliters of water in which 812 grams of magnesium chloride was dissolved. The steel specimens of Examples 1–6 were Type 304 stainless steel, as received, 1/64 inch thick and sheared, hot-rolled, annealed and pickled. The steel specimens of Examples 7–23 were Type 347 stainless steel, 1/16 inch thick with a 2B finish. These specimens were in the same as received condition of the specimens of Table I i.e., hot-rolled, annealed and pickled, edges polished with 80–120 grit. In Example 20, the specimens of Example 19 were placed in a solution that contained no Additive No. 1, the inhibitor.

The results of these examples are set forth in Table III below:

TABLE III

| Example No. | Additive No. 1 Hg(NO$_3$)$_2$.H$_2$O (ppm as Hg) | Additive No. 2 ppm(HNO$_3$) | Time (hrs) | Cracked |
|---|---|---|---|---|
| 1 | 0 | 0 | ½ | yes |
| 2 | 0 | 0 | ½ | yes |
| 3 | 0 | 0 | ½ | yes |
| 4 | 300 | 0 | 120 | no |
| 5 | 300 | 0 | 120 | no |
| 6 | 300 | 0 | 120 | no |
| 7 | 0 | 0 | 2 | yes |
| 8 | 0 | 0 | 10 | yes |
| 9 | 0 | 0 | 6 | yes |
| 10 | 1000 | 0 | 18 | no |
| 11 | 1000 | 0.008 | 42 | no |
| 12 | 100 | 0 | 45 | no |
| 13 | 100 | 0 | 64 | no |
| 14 | 100 | 0.008 | 88 | no |
| 15 | 100 | 0.008 | 165 | no |
| 16 | 200 | 0 | 119 | no |
| 17 | 10 | 0 | 59 | yes |
| 18 | 10 | 0.001 | 103 | no |
| 19 | 20 | 0.001 | 192 | no |
| 20 | 0 | 0 | 96 | yes |
| 21 | 10 | 0.008 | 200 | yes |
| 22 | 30 | 0.15 | 248 | yes |
| 23 | 20 | 0.001 | 90 | no |

It will be noted in the Examples of Table III that without the addition of mercuric nitrate to the magnesium chloride fluid enviroment, cracking of the stainless steel specimens occurred quickly, within as little as 2 hours, such as in Example 7. The addition of the quantities of mercuric nitrate shown brought about vast improvement in the time before cracking and in most examples, no cracking whatsoever of the steel specimens resulted during the period of the test. As indicated above, nitric acid (Additive No. 2) was introduced in the fluid enviroment to adjust the pH of the solution.

In order to corroborate what is believed to be one of the phenomena of the invention, that is the protective action of mercury on the stainless steel surface when the additive used is mercuric nitrate, a series of examples were conducted using mercury metal. In the examples of Table IV below, Type 347 stainless steel specimens, prepared similarly to those specimens of Table II, were floated on a puddle of mercury metal that had been poured into the 42 percent magnesium chloride solution. As set forth in the Examples of Table IV, although cracking occurred, the period of time required for each specimen to crack was considerable and the periods were substantially longer than the cracking times of those specimens of Table III where no additive was used as in Examples 1-3 and 7-9. Table IV is as follows:

TABLE IV

| Example No. | Additive | Corrosion Rate (mpy) | Cracked |
|---|---|---|---|
| 1 | 0 | 210 | yes |
| 2 | 0 | 16 | yes |
| 3 | 0 | 24 | yes |
| 4 | 0 | 222 | yes |

While there has been described what at present is believed to be the preferred embodiment of the invention, it will be understood by those skilled in the art that various changes and modifications may be made therein without departing from the invention.

Having thus described the invention, what is claimed is:

1. A method of inhibiting stress cracking of stainless steel in a chloride-ion fluid environment comprising, contacting a stainless steel surface in a chloride-ion containing fluid environment with mercuric nitrate in an effective amount to inhibit stress cracking of said stainless steel surface.

2. A method in accordance with claim 1 comprising the further step of adjusting the pH of said chloride ion-containing fluid by the addition thereto of from 0.001 to 0.008 parts per million of said chloride ion-containing fluid of nitric acid.

3. A method in accordance with claim 1 wherein said contacting step is carried out by adding said mercuric nitrate to said chloride-ion containing fluid environment.

4. A method in accordance with claim 3 wherein said chloride-ion containing fluid enviroment comprises an aqueous solution containing a quantity of chloride-ions.

5. A method in accordance with claim 4 wherein the quantity of mercuric nitrate added is within the range of 2–1000 parts per million of said chloride-ion containing fluid enviroment.

* * * * *